US 008168689B2

(12) United States Patent
Weng et al.

(10) Patent No.: US 8,168,689 B2
(45) Date of Patent: May 1, 2012

(54) HIGH OPTICAL CONTRAST PIGMENT AND COLORFUL PHOTOSENSITIVE COMPOSITION EMPLOYING THE SAME AND FABRICATION METHOD THEREOF

(75) Inventors: Chin-Cheng Weng, Kaohsiung (TW); Kuo-Tung Huang, Hsinchu County (TW); I-Jein Cheng, Changhua County (TW); Ming-Tzung Wu, Yunlin County (TW); Yu-Ying Hsu, Changhua County (TW); Chiang-Yun Li, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 830 days.

(21) Appl. No.: 12/098,492

(22) Filed: Apr. 7, 2008

(65) Prior Publication Data

US 2009/0085016 A1 Apr. 2, 2009

(30) Foreign Application Priority Data

Oct. 1, 2007 (TW) ................................ 96136748 A

(51) Int. Cl.
*C08J 3/28* (2006.01)
*C08F 2/50* (2006.01)
*G03C 1/00* (2006.01)
*G03F 7/033* (2006.01)

(52) U.S. Cl. ................ 522/75; 522/71; 522/74; 522/81; 522/104; 522/107; 522/99; 522/113; 522/114; 522/120; 522/121; 522/150; 522/153; 522/154; 522/178; 522/181; 522/182; 522/183; 430/269; 430/270.1; 430/281.1; 430/285.1; 430/286.1; 430/287.1; 430/292; 252/582; 252/586; 252/589

(58) Field of Classification Search .................. 430/269, 430/270.1, 281.1, 285.1, 286.1, 287.1, 292; 522/71, 74, 81, 75, 104, 107, 99, 113, 114, 522/120, 121, 150, 153, 154, 178, 181, 182, 522/183; 252/582, 586, 589
See application file for complete search history.

(56) References Cited

U.S. PATENT DOCUMENTS 3,201,051 A * 8/1965 Manger et al. .................. 241/22
5,284,511 A * 2/1994 Rolf et al. ...................... 106/410
5,534,055 A * 7/1996 Gerson et al. ................. 106/413
5,968,688 A 10/1999 Masuda et al.
6,100,312 A 8/2000 Suzuki et al.
2004/0032545 A1 2/2004 Stephenson et al.
2004/0235985 A1 11/2004 Ichimura et al.
2009/0027612 A1* 1/2009 Tomita et al. ................. 349/182
2009/0169887 A1* 7/2009 Reipen et al. ................. 428/402

FOREIGN PATENT DOCUMENTS

| CA | 2536272 | 3/2005 |
|---|---|---|
| CN | 1360617 | 7/2002 |
| CN | 1424624 | 6/2003 |
| JP | 61095303 | 5/1986 |
| JP | 61095304 | 5/1986 |
| JP | 63157476 | 6/1988 |
| JP | 63213960 | 9/1988 |
| JP | 06256039 | 9/1994 |
| JP | 06265719 | 9/1994 |
| JP | 10076122 | 3/1998 |
| JP | 10239680 | 9/1998 |
| JP | 2000128754 | 5/2000 |
| JP | 2001354869 | 12/2001 |
| JP | 2002201194 | 7/2002 |
| WO | WO2005019874 | 3/2005 |
| WO | WO 2007/045312 | 4/2007 |
| WO | WO 2007045312 A2 * | 4/2007 |
| WO | WO2007100153 A1 * | 9/2007 |

OTHER PUBLICATIONS

Gafast Pigment Red 254 data sheet. (online). [Retrieved online Sep. 15, 2011]. Retrived from <URL:http://www.ghardapigments.com/products_tds_msds/TDS%20PR%20254-111.pdf>.*
Taiwanese language office action dated Nov. 23, 2011.
Chinese language office action dated Jan. 31, 2012.
English language translation of abstract CN 1360617 (published Jul. 24, 2002).
English language translation of abstract of CN 1424624 (published Jun. 18, 2003).
English language translation of abstract of WO 2007/045312 (p. 1 of publication, published Apr. 26, 2007).

* cited by examiner

*Primary Examiner* — Sanza McClendon
(74) *Attorney, Agent, or Firm* — Thomas|Kayden

(57) ABSTRACT

A high optical contrast pigment and colorful photosensitive composition employing the same are disclosed. The composition comprises a solvent, an alkali-soluble resin, reactive monomer, and a modified pigment which has low crystallization. The low crystallization degree means that the grain size variation R is not more 80%, wherein the grain size variation R is represented by a formula R=G1/G0×100%, G0 is the original grain size, and G1 is the grain size after modification.

15 Claims, 1 Drawing Sheet

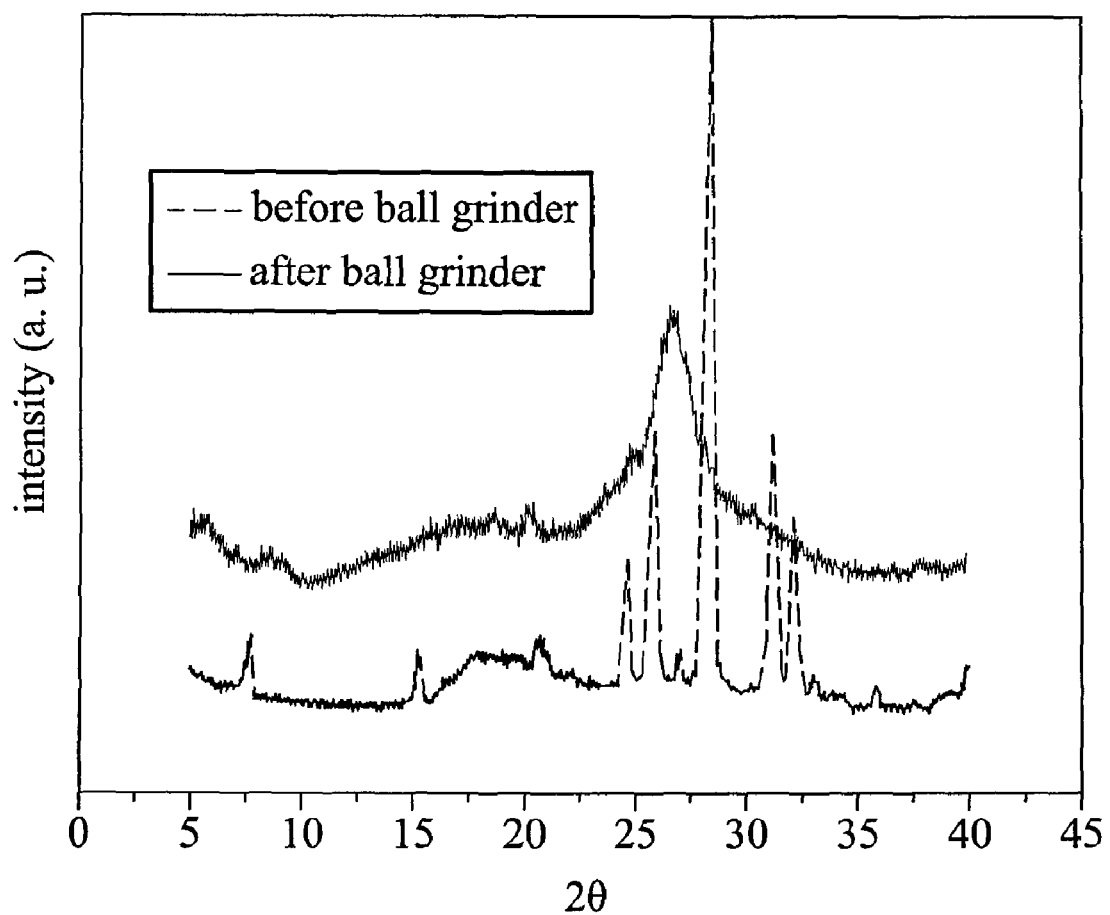

HIGH OPTICAL CONTRAST PIGMENT AND COLORFUL PHOTOSENSITIVE COMPOSITION EMPLOYING THE SAME AND FABRICATION METHOD THEREOF

BACKGROUND OF THE INVENTION

1. Field of the Invention

In general, thin film transistor liquid-crystal displays (TFT-LCD) employ RGB color-filters fabricated by black and R G B photosensitive resin, wherein the RGB color-filters exhibits high transparency and superior color saturation. Conventional pigments have high transparency and superior color saturation optical properties, but have poor thermal property and light stability.

In order to solve the aforementioned problems, a color photoresist prepared by a pigment modified and dispersing process have been developed and is widely used in full-color display fabrication.

Within the development of large-sized displays, the enhancement of display brightness has been studied continuously in last 10 years. Along with the monitor brightness promotion, the monitor operating temperature also relatively enhances. Therefore, the pigment stability is relatively important. Furthermore, reducing the pigment size is apt to improve the color saturation and contrast and reduce scattering of light.

Due to the high optical properties requirement of light transparency for color filters, the pigment size should be reduced to nano-dispersion. However, as pigment size reduces to nano scale, the surface area and surface energy will increase (according to the second law of thermodynamics). Additionally, pigment particles are apt to gather together when it reduced to nano scale. To stabilize the nano pigment, more dispersing agent is needed to decrease the surface tension. However, as the amount of dispersing agent used increased, and the viscosity of pigment composition will increase and then the compatibility of the photo resist will decrease.

The contrast of the color filter depends on the contrast enhancement of the photo resist. U.S. Pat. No. 20040235985 discloses an organic pigment packaged with high transparent polymer, enhancing the transparency and contrast of the color filter. Further, modified inorganic nano particles can serve as the core and the pigment is packaged to the core, resulting in high contrast of photo resist.

U.S. Pat. No. 6,100,312 discloses a graft copolymer serving as a dispersing agent to mix with a pigment for producing nano-dispersion under 60 nm. Moreover, U.S. Pat. No. 5,968,688 discloses a pigment packaged with transparent resin and modified by anthraquinone or phthalocyanine, in order to enhance thermal and color stability.

However, the previous invention improve the thermal property and stability of photo resist but the improvement of scattering and polarization effect which comes from the crystalline of pigment is not mentioned. In this patent, ours invention provides a method to prepare pigments with low crystallization degree, in order to reduce the effect of scattering and polarization and increase the contrast of a color filter.

BRIEF SUMMARY OF THE INVENTION

A detailed description is given in the following embodiments with reference to the accompanying drawings. These and other problems are generally solved or circumvented, and technical advantages are generally achieved, by preferred illustrative embodiments of the invention.

High optical contrast pigments are provided. In this regard, an exemplary embodiment exhibits a low crystallization degree or amorphous phase. The low crystallization degree means grain size variation R of not more than 80%, wherein the grain size variation R is represented by a formula $R=G1/G0\times100\%$, G0 is the original grain size, and G1 is the grain size after modification.

A colorful photosensitive composition comprising the above high optical contrast pigment is also provided, in which the composition includes: (a) alkali-soluble resin; (b) photosensitive reactants; (c) solvent; and (d) the above high optical contrast pigment.

In another exemplary embodiment, the method for preparing the high optical contrast pigment is also provided. An exemplary embodiment of the method comprises subjecting a pigment to modification to obtain a modified pigment exhibiting a low crystallization degree or amorphous phase. Particularly, the modification comprises a treatment with a chemical acid solution or mechanical milling treatment.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 shows an X-ray Diffraction spectrum of a red pigment R254 before and after a mechanical milling treatment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

According to embodiments of the invention, high optical contrast pigments and colorful photosensitive compositions employing the same are provided. The composition comprises a solvent, an alkali-soluble resin, reactive monomer, and a low crystallization modified pigment. The high optical contrast pigment with low crystallization provides the colorful photosensitive composition with superior high contrast, and thus is highly suitable for producing color filters of liquid crystal displays or flexible displays.

The high optical contrast pigments of the invention comprise pigments that are prepared by modifying conventional pigments to decrease crystallization, thereof, the surface chemical proprieties of the pigment is not change as comparing with the pigment without modification. Therefore, the pigments of the invention can be prepared to form a photoresist composition by the conventional processes. The pigment, subjected to the modification, can comprise Pigment Red 122, Pigment Red 202, Pigment Red 206, Pigment Red 209, Pigment Red 177, Pigment Red 254, Pigment Yellow 13, Pigment Yellow 55, Pigment Yellow 119, Pigment Yellow 138, Pigment Yellow 139, Pigment Yellow 168, Pigment Yellow 150, Pigment Green 7, Pigment Green 36, Pigment Blue 15:3, Pigment Blue 15:4, or Pigment Blue 15:6. Further, an inorganic pigment can be mixed with the modified pigments in order to reduce crystallization. The inorganic pigment can be a black pigment such as carbon black, graphite, or metal oxide (for example titanium oxide, silicon oxide, barium oxide, titanium dioxide, or calcium carbonate).

In general, the pigment of the photoresist composition has a main function for providing light shielding properties. It is very important to control the grain size in order to maintain the performance of the photoresist. An overly large particle size can result in poor transparency, and an overly small particle size can result in poor thermal stability. Therefore, the particle size must be controlled within the range of 0.05~0.15 micron-meter.

Pigments with high crystallization degree can polarize the light which passes through the pigments and resulting in light leak. Therefore, the embodiments of the invention provide processes to reduce crystallization degree of pigments.

The modification to reduce the crystallization of the pigment comprises an acid paste (treatment with a chemical acid solution) or a mechanical milling treatment, as disclosed as follows:

Mechanical Milling

First, the pigment (or powder thereof) is sufficiently mixed with or without a dispersing agent. The mixture is filled into a ball miller under a specific temperature and pressure, thereby reducing the crystallization thereof. Further, inorganic particles such as NaCl, $SiO_2$, or $TiO_2$ can be added into the mixture before the milling treatment. After milling, the product is washed via water and gathered. Accordingly, mechanical milling has a simple process and results in high yields.

FIG. 1 shows an X-ray Diffraction spectrum of a red pigment R254 before and after a mechanical milling.

Referring to FIG. 1, the continuous line (after mechanical milling) shows the disappearance of the crystalline peak of the dashed line (before mechanical milling), and only one peak remains in 22-350 of 2θ. After measured via Scherrer equation, we know the grain size is reduced from 22.1 nm to 9.5 nm.

Scherrer equation:

$$t=0.9\lambda/B\cos(\theta)$$

t: grain size
B: full-width at half maximum (FWHM)
λ: wavelength of x-ray °

Accordingly, the crystallization of pigment can be decreased by the mechanical milling treatment, preparing modified pigment exhibiting a low crystallization degree or amorphous phase. Further, the pigment can be preferably milled after mixing with a dispersing agent, in order to further reduce the crystallization of the pigment.

The crystallization degree of pigment can be represented by the grain size variation R, as the following formula:

$$R=G_1/G_0\times100\%$$

Wherein $G_0$ is the original grain size, and $G_1$ is the grain size after modification. In general, the low crystallization degree means that the grain size variation R is not more 80%.

Acid Paste:

A pigment is dissolved into a strong acid solution (such as sulfuric acid or perfluoroacetic acid), and the precipitate of the solution is gathered. The process of acid paste is complicated, and the results are further treated to prepare the modified pigment.

According to embodiments of the invention, colorful photosensitive compositions employing the high optical contrast pigments are also provided. The composition comprises:
(a) alkali-soluble resin; (b) photo-sensitive reactants; (c) solvent; and (d) the previously mentioned high optical contrast pigment.

The high optical contrast pigment is prepared by subjecting an original pigment to modification to degrade the crystallization degree thereof. The original pigment can be Pigment Red 122, Pigment Red 202, Pigment Red 206, Pigment Red 209, Pigment Red 177, Pigment Red 254, Pigment Yellow 13, Pigment Yellow 55, Pigment Yellow 119, Pigment Yellow 138, Pigment Yellow 139, Pigment Yellow 168, Pigment Yellow 150, Pigment Green 7, Pigment Green 36, Pigment Blue 15:3, Pigment Blue 15:4, Pigment Blue 15:6, LFF-MA7, LFF-MA100, HCF-#2650, MCF-88, M2650, MA7, Special 4A, FW-18, S90B, Mogul L, M900, M1000, RAVEN1200, RAVEN2000, or combinations thereof.

The alkali-soluble resin is in an amount of 6-10 parts by weight, based on 100 parts by weight of the composition. The alkali-soluble resin comprises acrylic resins with an acid group such as a methacrylic group or acrylic group. Further, the alkali-soluble resin can comprise polymethacrylate, polyacrylate, vinylated unsaturated polymer, or silicon-containing vinylated unsaturated polymer. For example, the alkali-soluble resin can be methyl (meth)acrylate, benzyl (meth)acrylate, ethyl (meth)acrylate, 2-hydroxyethyl (meth)acrylate, hydroxylpropyl (meth)acrylate, isobutyl (methy)acrylate, methyl acrylate, benzyl acrylate, ethyl acrylate, 2-hydroxyethyl acrylate, hydroxylpropyl acrylate, isobutyl acrylate, 3-(Trimethoxysilyl)propyl methacrylate, or methacrylic acid. Particularly, the molar ratio of the alkali-soluble resin can be between 10-50%, preferably between 20-40%. Furthermore, the alkali-soluble resin can have a molecular weight of between 1000~100,000 g/mol, preferably between 6,000~20,000 g/mol.

The photo-sensitive reactants comprise a multi-functional reactive monomer and a photoinitiator. The multi-functional reactive monomer can have at least two double bonds. Further, the photoinitiator exhibits preferable efficiency under an exposed wavelength, and the photoinitiator can be a UV photoinitiator. The photoinitiator can comprise acetophenone (such as 2-methyl-1-(4-(methylthio)phenyl)-2-morpholino-1-propane, 1-hydroxy cyclohexyl phenyl ketone, diethoxyacetophenone, 2-hydroxy-2-methyl-1-phenyl-propane-1-one), or 2-benzyl-2-(dimethylamino)-1-[4-(4-morpholinyl)phenyl]-1-butanone), benzoin (such as benzoin methyl ether, or benzyl dimethyl ketar), benzophenone (such as benzophenone, 4-phenyl benzophenone, or hydroxyl benzophenone), thioxanthone (such as isopropylthioxanthone, or 2-chlorothioxanthone), anthraquinone (such as 2-ethylanthraquinone)

The multi-functional reactive monomer can be ethylene glycol dimethacrylate, 1,4-butanediol diacrylate, diethylene glycol diacrylate, pentaerythritol triacrylate, ethoxylated trimethylpropane triacrylate, dipentaerythritol pentaacrylate, ethoxylated pentaerythritol tetraacrylate, pentaerythritol tetraacrylate, or dipentaerythritol hexaacrylate.

According to an embodiment of the invention, the solution can comprise cyclohexanone, ethylene glycol ether, ethylene glycol monoethyl ether, ethylene glycol monobutyl ether, propylene glycol monomethyl ether acetate, ethyl-2-ethoxyethanol acetate, or combinations thereof.

The colorful photosensitive composition can further comprise a dispersing agent, leveling agent, defoam agent, or adhesive agent. The dispersing agent is helpful to effectively control pigment grain-size distribution and increase the dissolving compatibility of the pigment and the photo-sensitive reactants. The dispersing agent may be an anionic surfactant, a cationic surfactant, or non-ionic surfactant, such as a polymer dispersing agent.

The solid content of the composition can be between 10-40% (the alkali-soluble resin, the photo-sensitive reactants, and the high optical contrast pigment total in an amount of 10-40 parts by weight, based on 100 parts by weight of the composition), preferable 18-28%. The coating from the composition can have a thickness of 1-1.5 micro-meter. Table 1 shows component amount of the photoresist

TABLE 1

| Component | wt % |
|---|---|
| alkali-soluble resin | 6~10 |
| reactive monomer | 4~7 |
| Initiator | 1~5 |
| pigment with low crystallization | 8~20 |
| dispersing agent | 0.8~10 |
| solvent | 80~48 |

The preparation of the colorful photosensitive composition comprises the following steps. First, the pigment is modified to decrease the crystallization, obtaining a high optical contrast pigment. Next, the high optical contrast pigment is mixed with the dispersing agent and dissolved into the solvent. After stirring, the alkali-soluble resin, reactive monomer, and the initiator are added into the solution and mixed completely.

The colorful photosensitive composition can be used to form a film serving as a color filter. The method for fabricating the color filter employing the composition comprises forming a coating of the composition on a glass substrate by spin coating. After baking at 90° C. for 2 min, the coating is exposed under a UV-light with energy of 100-500mJ/cm². The reactive monomers in the exposed patterns of the coating perform a crosslink reaction. Next, the coating is developed with an alkali solution and the unexposed part of the coating is removed. After drying by air, the patterned film is baked at 230° C. for one hour, thereby obtaining the patterned film. After repeating the above steps for forming RGB patterned films respectively and forming the black matrix, a RGB color filter array is fabricated.

The following examples and comparative examples are intended to demonstrate this invention more fully without limiting its scope, since numerous modifications and variations will be apparent to those skilled in the art.

PREPARATIVE EXAMPLE 1

Preparation of a Red Pigment with Low Crystallization (Without Dispersing Agent)

1370 g of grinding glass beads (with a diameter of 10 mm) and 100 g of red pigment (Pigment Red 254, Ciba) were added into a mill jar (4000 ml). After uniform mixing, the pigment was ground by a double-layered type pearl mill with a mill speed of 600 rpm/min. After grinding for 96 hr, the results were gathered.

PREPARATIVE EXAMPLE 2

Preparation of a Red Pigment with Low Crystallization (With Dispersing Agent)

1370 g of grinding glass beads (with a diameter of 10 mm), 100 g of red pigment (Pigment Red 254, Ciba), and 48.75 g dispersing agent (3.75 g of No. 22000 (sold by SOLSPERSE) and 45 g of No. 24000 (sold by SOLSPERSE)) were added into a mill jar (4000 ml). After uniform mixing, the pigment was ground by a double-layered type pearl mill with a mill speed of 600 rpm/min. After grinding for 96 hr, the results were gathered.

PREPARATIVE EXAMPLE 3

Preparation of a Green Pigment with Low Crystallization 1370 g of grinding glass beads (with a diameter of 10 mm), 100 g of red pigment (Pigment Green 36, BASF), and 35 g dispersing agent (8.75 g of No. S-5000 (sold by SOLSPERSE) and 26.25 g of No. 24000 (sold by SOLSPERSE)) were added into a mill jar (4000 ml). After uniform mixing, the pigment was ground by a double-layered type pearl mill with a mill speed of 600 rpm/min. After grinding for 96 hr, the results were gathered.

PREPARATIVE EXAMPLE 4

Preparation of a Blue Pigment with Low Crystallization 1370 g of grinding glass beads (with a diameter of 10 mm), 100 g of red pigment (Pigment Blue 15:6, BASF), and 48 g dispersing agent (10 g of No. S-5000 (sold by SOLSPERSE) and 38 g of No. 24000 (sold by SOLSPERSE)) were added into a mill jar (4000 ml). After uniform mixing, the pigment was ground by a double-layered type pearl mill with a mill speed of 600 rpm/min. After grinding for 96 hr, the results were gathered.

EXAMPLE 1

A polyethylene mill jar (250 ml) was half filled with zirconia ball (having a diameter of 1 mm). Next, 10 g of modified pigment provided by preparative example 1, 80 g of propylene glycol methyl ether acetate (PGMEA), and 4.88 g of dispersing agent (4.5 g of No. 24000 (sold by SOLSPERSE) and 0.38 g of No. 22000 (sold by SOLSPERSE)) were added into the mill jar.

After mixing, the composition was dispersed by a mill (sold by Red Devil Equipment Co) for 4 hr. The result was gathered and added into a three-necked bottle (500 ml) under nitrogen atmosphere. Next, 96.7 g of PGMEA, 20 g of acrylic resin, 6 g of dipentaerythritol hexaacrylate (serving as a reactive monomer), 0.5 g of Isopropylthioxanthone, and 4.5 g of 2-Benzyl-2-(dimethylamino)-1-[4-(4-morpholinyl) phenyl]-1-butanone (I389) (serving as an initiator) were added into the bottle, preparing a color filter photoresist composition. The composition was coated by spin coator to form a film on a glass substrate with a coating speed of 600 rpm for 15 sec and 900 rpm for 20 sec. After baking at 90° C. for 2 min, the film was exposed with ultraviolet rays having energy of 150 mj/cm2 and developed with alkali developing solution (0.5% KOH) to remove the unexposed photoresist. After hard baking at 230° C. for 1 hr, the patterned color filter was obtained. After, the contrast of the color filter was measured with a polarizer (sold and fabricated by Nitto Denko) as calibration.

EXAMPLE 2

A polyethylene mill jar (250 ml) was half filled with zirconia ball (having a diameter of 1 mm). Next, 14.88 g of modified pigment provided by preparative example 2, and 80 g of propylene glycol methyl ether acetate (PGMEA) were added into the mill jar. After mixing, the composition was dispersed by a mill (sold by Red Devil Equipment Co) for 4 hr. The result was gathered and added into a three-necked bottle (500 ml) under nitrogen atmosphere. Next, 96.7 g of PGMEA, 20 g of acrylic resin, 6 g of dipentaerythritol hexaacrylate (serving as a reactive monomer), 0.5 g of Isopropylthioxanthone (serving as an initiator), and 4.5 g of 2-Benzyl-2-(dimethylamino)-1-[4-(4-morpholinyl)phenyl]-1-butanone (I389) were added into the bottle, preparing a color filter photoresist composition. The composition was coated to form a film on a glass substrate with a coating speed of 600 rpm for 15 sec and 900 rpm for 20 sec. After baking at 90° C. for 2 min, the film was irradiated with ultraviolet rays having energy of 150 mj/cm2 and developed with alkali developing solution (0.5% KOH), removing the unexposed photoresist. After hard baking at 230° C. for 1 hr, the patterned color filter was obtained.

EXAMPLE 3

Example 3 was performed as Example 2 except for the substitution of 14.88 g of the modified pigment provided by preparative example 2 for 13.5 g of the modified pigment provided by the preparative example 3.

EXAMPLE 4

Example 4 was performed as Example 2 except for the substitution of 14.88 g of the modified pigment provided by the preparative example 4 for 14.8 g of the modified pigment provided by the preparative example 4.

COMPARATIVE EXAMPLE 1

Comparative Example 1 was performed as Example 1 except for the substitution of the modified pigment provided by the preparative example 1 for the non-modified Pigment Red 254 (sold and fabricated by Ciba).

COMPARATIVE EXAMPLE 2

Comparative Example 1 was performed as Example 1 except for the substitution of the modified pigment provided by the preparative example 1 for the non-modified Pigment Green 36 (sold and fabricated by BASF).

COMPARATIVE EXAMPLE 3

Comparative Example 1 was performed as Example 1 except for the substitution of the modified pigment provided by the preparative example 1 for the non-modified Pigment Blue 15:6 (sold and fabricated by BASF).

Please refer to Table 2, showing the characteristics of color filter films provided by Example 1~4 and Comparative Example 1-3.

TABLE 2

| | CIE coordinates | | thickness | | crystallization |
|---|---|---|---|---|---|
| | x | y | (um) | contrast | degree |
| Example 1 | 0.6567 | 0.3357 | 1.15 | 1573 | low crystallization degree |
| Example 2 | 0.6492 | 0.3346 | 1.18 | 2517 | low crystallization degree |
| Example 3 | 0.2248 | 0.4293 | 1.07 | 2684 | low crystallization degree |
| Example 4 | 0.1333 | 0.1215 | 1.46 | 1588 | low crystallization degree |
| Comparative Example 1 | 0.5383 | 0.3197 | 1.23 | 1567 | high crystallization degree |
| Comparative Example 2 | 0.2356 | 0.4010 | 1.13 | 1775 | high crystallization degree |
| Comparative Example 3 | 0.1451 | 0.1106 | 1.42 | 1405 | high crystallization degree |

Accordingly, the present invention provided a colorful photosensitive composition for fabricating a color filter film with high contrast. Specifically, the embodiments of the invention provide a process for decreasing crystallization degree of pigments, wherein the characteristics of pigments are remained. The pigments with low crystallization degree are apt to disperse in a solution and are suitable to be employed in a colorful photosensitive composition for fabricating a color filter film.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A colorful photosensitive composition, comprising:
  (a) alkali-soluble resin;
  (b) photo-sensitive reactants;
  (c) solvent; and
  (d) high optical contrast pigment, which exhibits a low crystallization degree or amorphous phase, wherein the low crystallization degree means that the grain size variation R is not more 80%, wherein the grain size variation R is represented by a formula $R=G1/G0 \times 100\%$, G0 is the original grain size, and G1 is the grain size after modification.

2. The composition as claimed in claim 1, wherein the alkali-soluble resin, the photo-sensitive reactants, and the high optical contrast pigment total in an amount of 20-60 parts by weight, based on 100 parts by weight of the composition.

3. The composition as claimed in claim 1, wherein the photo-sensitive reactants comprise a multi-functional reactive monomer and a photo initiator.

4. The composition as claimed in claim 3, wherein the multi-functional reactive monomer has at least two double bonds.

5. The composition as claimed in claim 3, wherein the photoinitiator comprises a UV photo initiator.

6. The composition as claimed in claim 3, wherein the multi-functional reactive monomer is in an amount of 4-7 parts by weight, based on 100 parts by weight of the composition.

7. The composition as claimed in claim 3, wherein the photoinitiator is in an amount of 1-5 parts by weight, based on 100 parts by weight of the composition.

8. The composition as claimed in claim 1, wherein the alkali-soluble resin is in an amount of 6-10 parts by weight, based on 100 parts by weight of the composition.

9. The composition as claimed in claim 1, wherein the alkali-soluble resin comprises acrylic resins with an acid group.

10. The composition as claimed in claim 9, wherein the acid group comprises methacrylic group or acrylic group.

11. The composition as claimed in claim 1, wherein the alkali-soluble resin comprises polymethacrylate, polyacrylate, vinylated unsaturated polymer, or silicon-containing vinylated unsaturated polymer.

12. The composition as claimed in claim 1, wherein the solution comprises cyclohexanone, ethylene glycol ether, ethylene glycol monoethyl ether, ethylene glycol monobutyl ether, propylene glycol monomethyl ether acetate, ethyl-2-ethoxyethanol acetate, or combinations thereof.

13. The composition as claimed in claim 1, further comprising a dispersing agent.

14. The composition as claimed in claim 1, further comprising a leveling agent, defoamer agent, or adhesive.

15. The composition as claimed in claim 1, wherein a coating of the composition serves as color filters of a display.

* * * * *